US010735126B1

(12) United States Patent
Koopferstock

(10) Patent No.: US 10,735,126 B1
(45) Date of Patent: Aug. 4, 2020

(54) SPLITTER-BASED COLORLESS-DIRECTIONLESS-CONTENTIONLESS RECONFIGURABLE OPTICAL ADD/DROP MULTIPLEXER

(71) Applicant: Fujitsu Limited, Kawasaki-shi, Kanagawa (JP)

(72) Inventor: Eric Koopferstock, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/505,313

(22) Filed: Jul. 8, 2019

(51) Int. Cl.
*H04J 14/02* (2006.01)
*H04Q 11/00* (2006.01)
*G02B 6/28* (2006.01)
*H04B 10/25* (2013.01)

(52) U.S. Cl.
CPC ........ *H04J 14/0212* (2013.01); *G02B 6/2821* (2013.01); *H04B 10/2504* (2013.01); *H04Q 11/0001* (2013.01); *H04Q 2011/0015* (2013.01); *H04Q 2011/0016* (2013.01)

(58) Field of Classification Search
CPC .............. H04J 14/0212; G02B 6/2821; H04B 10/2504; H04Q 11/0001; H04Q 2011/0015; H04Q 2011/0016
See application file for complete search history.

(56) References Cited

U.S. PATENT DOCUMENTS

| | | | | |
|---|---|---|---|---|
| 9,762,322 | B1* | 9/2017 | Amundson | H04B 10/2504 |
| 2012/0027408 | A1* | 2/2012 | Atlas | H04J 14/0204 398/58 |
| 2014/0255026 | A1* | 9/2014 | Roorda | H04J 14/0212 398/49 |
| 2016/0149664 | A1* | 5/2016 | Wagener | H04Q 11/0005 398/49 |
| 2016/0360301 | A1* | 12/2016 | Li | H04Q 11/0005 |
| 2019/0103918 | A1* | 4/2019 | Saenz | G02B 6/4452 |
| 2019/0165877 | A1* | 5/2019 | Way | H04J 14/0212 |
| 2019/0238251 | A1* | 8/2019 | Chedore | H04J 14/0217 |
| 2020/0007262 | A1* | 1/2020 | Chedore | H04J 14/0204 |
| 2020/0073054 | A1* | 3/2020 | Yang | G02B 6/29385 |
| 2020/0076501 | A1* | 3/2020 | Searcy | H04B 10/07953 |
| 2020/0092027 | A1* | 3/2020 | Yu | H04J 14/0264 |

* cited by examiner

Primary Examiner — Mina M Shalaby
(74) Attorney, Agent, or Firm — Baker Botts L.L.P.

(57) ABSTRACT

A reconfigurable optical add/drop multiplexer (ROADM) complex in an optical network may include one or more core ROADM devices, each including multiple input/output port pairs configured for respective wavelengths or wavelength bands to be coupled to a fiber distribution panel (FDP) over fiber. The FDP may include multiple FDP connectors to receive optical signals from the core ROADM device(s) and may extract and route optical signals having a single wavelength to respective transponder connectors of the FDP for coupling to a transponder. Multiple expansion options may be enabled at the FDP. For example, according to one option, a single expansion connector may be enabled for coupling to an expansion device to provide additional drop port capacity. In another example, multiple expansion connectors may be enabled for coupling to respective expansion devices.

20 Claims, 9 Drawing Sheets

SPLITTER-BASED COLORLESS-DIRECTIONLESS-CONTENTIONLESS RECONFIGURABLE OPTICAL ADD/DROP MULTIPLEXER

BACKGROUND

Field of the Disclosure

The present disclosure relates generally to optical communication networks and, more particularly, an optical system including a splitter-based colorless-directionless-contentionless reconfigurable optical add/drop multiplexer.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), quadrature amplitude modulation (QAM), statistically based mixed coherent modulation, and adaptive modulation.

Optical networks may also include various optical elements, such as amplifiers, dispersion compensators, multiplexer/demultiplexer filters, wavelength selective switches (WSS), optical switches, splitters, couplers, etc. to perform various operations within the network. In particular, optical networks may include reconfigurable optical add-drop multiplexers (ROADMs) that enable routing of optical signals and individual wavelengths to different destinations. Classic point-point or ROADM systems can use 50 or 100 GHz fixed grid multiplexer/demultiplexer devices. However, these types of systems may be difficult to implement as future transmission payloads get progressively larger with each new generation.

SUMMARY

In one aspect, a reconfigurable optical add/drop multiplexer (ROADM) complex includes a first contentionless wavelength selective switch (WSS) device that includes a plurality of input ports, a second contentionless WSS device that includes a plurality of output ports, each output port being associated with a respective one of the plurality of input ports in one of a first plurality of input/output port pairs, and each input/output port pair being mapped to a respective wavelength band, a first port connector configured for coupling to a first fiber optic cable carrying multiple optical signals on respective fibers each within a first collection of wavelength bands to and from the respective input/output port pairs to which the first collection of wavelength bands are mapped, and a fiber distribution panel (FDP). The fiber distribution panel includes a first FDP connector configured to receive the first fiber optic cable coupled to the first port connector, a first plurality of transponder connectors, each configured to be coupled to a respective transponder, and a first plurality of splitter/coupler devices, each configured to route an optical signal within a respective one of the first collection of wavelength bands between the first FDP connector and a respective one of the first plurality of transponder connectors.

In any of the disclosed embodiments, the first WSS device and the second WSS device may be elements of a first core ROADM device associated with a first degree of a plurality of degrees supported in the ROADM complex, and the first port connector may be an element of the first core ROADM device, the first FDP connector may be associated with the first degree. The ROADM complex may further include a second port connector configured for coupling to a second fiber optic cable carrying multiple optical signals on respective fibers each within a second collection of wavelength bands to and from the respective input/output port pairs to which the second collection of wavelength bands are mapped. The fiber distribution panel may further include a second FDP connector associated with the first degree, and a second plurality of splitter/coupler devices, each configured to route an optical signal within a respective one of the second collection of wavelength bands between the second FDP connector and a respective one of the first plurality of transponder connectors.

In any of the disclosed embodiments, the first WSS device and the second WSS device may be elements of a first core ROADM device associated with a first degree of a plurality of degrees supported in the ROADM complex, and the first port connector and the first FDP connector may be associated with the first degree. The ROADM complex may further include a third contentionless WSS device that includes a plurality of input ports and a fourth contentionless WSS device that includes a plurality of output ports, the third WSS device and the fourth WSS device being elements of a second core ROADM device associated with a second degree of the plurality of degrees, and a second port connector of the second core ROADM device and configured for coupling to a second fiber optic cable carrying multiple optical signals on respective fibers each within a second collection of wavelength bands to and from the respective input/output port pairs to which the second collection of wavelength bands are mapped. The fiber distribution panel may further include a second FDP connector associated with the second degree and configured to receive the second fiber optic cable coupled to the second port connector, and a second plurality of splitter/coupler devices, each configured to route an optical signal within a respective one of the second collection of wavelength bands between the second FDP connector and a respective one of the first plurality of transponder connectors.

In any of the disclosed embodiments, the ROADM complex may further include a second port connector configured for coupling to a second fiber optic cable carrying multiple optical signals on respective fibers each within a second collection of wavelength bands to and from the respective input/output port pairs to which the second collection of wavelength bands are mapped, and a first expansion device. The fiber distribution panel may further include a second FDP connector associated with an expansion option and configured to receive the second fiber optic cable coupled to the second port connector, and a first expansion connector that, when enabled, is configured for coupling to the first expansion device to add routing capacity to the ROADM complex, the first expansion connector being enabled for coupling to the first expansion device responsive to receipt of the second fiber optic cable at the second FDP connector.

In any of the disclosed embodiments, the first expansion connector may be one of a plurality of expansion connectors of the fiber distribution panel, each of which, when enabled, is configured for coupling to a respective expansion device to add routing capacity to the ROADM complex, the expansion option may be one of plurality of expansion options supported in the fiber distribution panel, and one or more of the plurality of expansion connectors, including the first expansion connector, may be enabled responsive to receipt of the second fiber optic cable at the second FDP connector, the number of expansion connectors enabled being dependent on which of the plurality of expansion options is associated with the second FDP connector.

In any of the disclosed embodiments, the expansion option associated with the second FDP connector may be an expansion option in which only the first expansion connector is enabled, and the first plurality of transponder connectors may include all of the transponder connectors of the fiber distribution panel.

In any of the disclosed embodiments, the expansion option associated with the second FDP connector may be an expansion option in which two or more of the plurality of expansion connectors, including the first expansion connector, are enabled, and the first plurality of transponder connectors may include fewer than all of the transponder connectors of the fiber distribution panel.

In any of the disclosed embodiments, the ROADM complex may further include, for each of the first plurality of splitter/coupler devices, a single channel amplifier configured to amplify the optical signal between the splitter/coupler device and the respective one of the first plurality of transponder connectors.

In another aspect, a disclosed optical network includes a plurality of transponders, and a reconfigurable optical add/drop multiplexer (ROADM) complex. The reconfigurable optical add/drop multiplexer complex includes a first contentionless wavelength selective switch (WSS) device that includes a plurality of input ports, a second contentionless WSS device that includes a plurality of output ports, each output port being associated with a respective one of the plurality of input ports in one of a first plurality of input/output port pairs, each input/output port pair being mapped to a respective wavelength band, a first port connector configured for coupling to a first fiber optic cable carrying multiple optical signals on respective fibers each within a first collection of wavelength bands to and from the respective input/output port pairs to which the first collection of wavelength bands are mapped, and a fiber distribution panel (FDP). the fiber distribution panel includes a first FDP connector configured to receive the first fiber optic cable coupled to the first port connector, a first plurality of transponder connectors, each configured to be coupled to a respective transponder, and a first plurality of splitter/coupler devices, each configured to route an optical signal within a respective one of the first collection of wavelength bands between the first FDP connector and a respective one of the first plurality of transponder connectors.

In any of the disclosed embodiments, the first WSS device and the second WSS device may be elements of a first core ROADM device associated with a first degree of a plurality of degrees supported in the ROADM complex, the first port connector may be an element of the first core ROADM device, and the first FDP connector may be associated with the first degree. The ROADM complex may further include a second port connector configured for coupling to a second fiber optic cable carrying multiple optical signals on respective fibers each within a second collection of wavelength bands to and from the respective input/output port pairs to which the second collection of wavelength bands are mapped. The fiber distribution panel may further include a second FDP connector associated with the first degree, and a second plurality of splitter/coupler devices, each configured to route an optical signal within a respective one of the second collection of wavelength bands between the second FDP connector and a respective one of the first plurality of transponder connectors.

In any of the disclosed embodiments, the first WSS device and the second WSS device may be elements of a first core ROADM device associated with a first degree of a plurality of degrees supported in the ROADM complex, and the first port connector and the first FDP connector may be associated with the first degree. The ROADM complex may further include a third contentionless WSS device that includes a plurality of input ports and a fourth contentionless WSS device that includes a plurality of output ports, the third WSS device and the fourth WSS device being elements of a second core ROADM device associated with a second degree of the plurality of degrees, and a second port connector of the second core ROADM device and configured for coupling to a second fiber optic cable carrying multiple optical signals on respective fibers each within a second collection of wavelength bands to and from the respective input/output port pairs to which the second collection of wavelength bands are mapped. The fiber distribution panel may further include a second FDP connector associated with the second degree and configured to receive the second fiber optic cable coupled to the second port connector, and a second plurality of splitter/coupler devices, each configured to route an optical signal within a respective one of the second collection of wavelength bands between the second FDP connector and a respective one of the first plurality of transponder connectors.

In any of the disclosed embodiments, the ROADM complex may further include a second port connector configured for coupling to a second fiber optic cable carrying multiple optical signals on respective fibers each within a second collection of wavelength bands to and from the respective input/output port pairs to which the second collection of wavelength bands are mapped, and a first expansion device. The fiber distribution panel may further include a second FDP connector associated with an expansion option and configured to receive the second fiber optic cable coupled to the second port connector, and a first expansion connector that, when enabled, is configured for coupling to the first expansion device to add routing capacity to the ROADM complex, the first expansion connector being enabled for coupling to the first expansion device responsive to receipt of the second fiber optic cable at the second FDP connector.

In any of the disclosed embodiments, the first expansion connector may be one of a plurality of expansion connectors of the fiber distribution panel, each of which, when enabled, is configured for coupling to a respective expansion device to add routing capacity to the ROADM complex, the expansion option may be one of plurality of expansion options supported in the fiber distribution panel, and one or more of the plurality of expansion connectors, including the first expansion connector, may be enabled responsive to receipt of the second fiber optic cable at the second FDP connector, the number of expansion connectors enabled being dependent on which of the plurality of expansion options is associated with the second FDP connector.

In any of the disclosed embodiments, the expansion option associated with the second FDP connector may be an expansion option in which only the first expansion connector is enabled, and the first plurality of transponder connectors may include all of the transponder connectors of the fiber distribution panel.

In any of the disclosed embodiments, the expansion option associated with the second FDP connector may be an expansion option in which two or more of the plurality of expansion connectors, including the first expansion connector, are enabled, and the first plurality of transponder connectors may include fewer than all of the transponder connectors of the fiber distribution panel.

In any of the disclosed embodiments, the expansion device may include a multi-cast switch or a contentionless WSS device.

In any of the disclosed embodiments, the ROADM complex may further include, for each of the first plurality of splitter/coupler devices, a respective pair of single channel amplifiers of opposite directions configured to amplify the optical signal between the splitter/coupler device and the respective one of the first plurality of transponder connectors.

In yet another aspect, a disclosed method includes receiving, at a first connector of a fiber distribution panel of a reconfigurable optical add/drop multiplexer (ROADM) complex from a first port connector of the ROADM complex, a first plurality of optical signals each within a respective one of a first plurality of wavelength bands, routing, by each of a first plurality of splitter/coupler devices of the ROADM complex to a respective one of a first plurality of transponders, an optical signal of the first plurality of optical signals within a respective one of the first plurality of wavelength bands, receiving, at a second connector of the fiber distribution panel of the ROADM complex from a second port connector of the ROADM complex, a second plurality of optical signals each within a respective one of a second plurality of wavelength bands different from the first plurality of wavelength bands, and routing, by each of a second plurality of splitter/coupler devices of the ROADM complex to a respective one of a second plurality of transponders, an optical signal of the second plurality of optical signals within a respective one of the second plurality of wavelength bands.

In any of the disclosed embodiments, the first port connector and the second connector may be associated with a first degree, and the method may further include receiving, at a third connector of the fiber distribution panel of the ROADM complex from a third port connector of the ROADM complex associated with a second degree, a third plurality of optical signals each within a respective one of the first plurality of wavelength bands, and routing, by each of a third plurality of splitter/coupler devices of the ROADM complex to a respective one of a third plurality of transponders, an optical signal of the third plurality of optical signals within a respective one of the first plurality of wavelength bands.

In any of the disclosed embodiments, the method may further include receiving, at a third connector of the fiber distribution panel of the ROADM complex from a third port connector of the ROADM complex, a third plurality of optical signals, and in response to receiving the third plurality of optical signals, enabling use of one or more expansion connectors, each configured to be coupled to an expansion device that includes a second plurality of transponder connectors.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
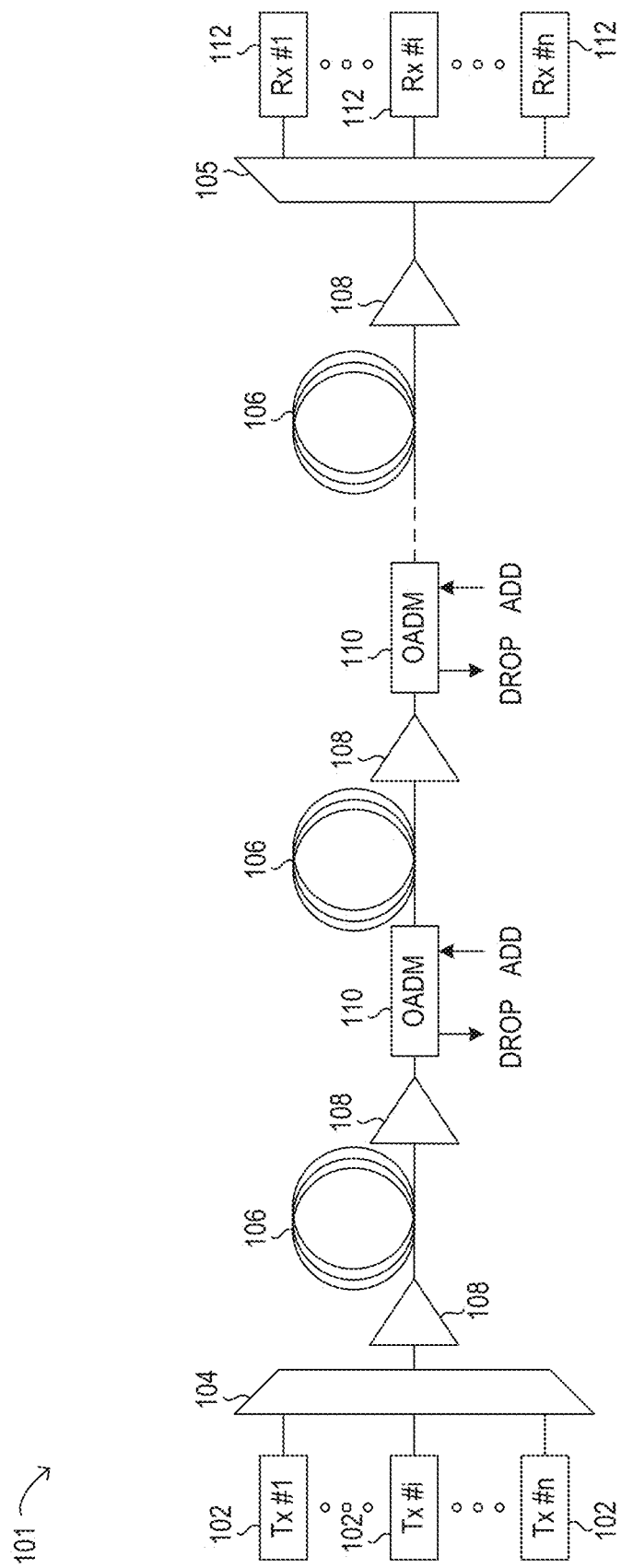
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

ROADMs are deployed in many applications in optical networks. Typical ROADMs are designed to accommodate eight or more degrees, each of which may support up to 96 optical channels or wavelengths in particular implementations. In describing a ROADM generally, a 'degree' is a term used to describe a switched optical path to or from the ROADM, which may be a bidirectional optical path or a pair of optical fibers in some instances. However, it has been observed that a typical ROADM in use utilizes two degrees and a small number of add and drop wavelengths.

Typical designs for ROADMs include a so-called "route and select" architecture in which two wavelength selective switches (WSS) are used to select and route optical signals. However, a WSS is a relatively complex optical device and typical designs for route and select ROADMs accommodate eight or more degrees. Concurrently, the use of coherent receiver optics has become widespread and provides the ability to exclusively tune a desired wavelength.

As will be described in further detail below, a ROADM complex is disclosed herein that allows for a lower cost of entry than existing ROADMs for small optical communication systems and provides expansion options for adding capacity to medium and large optical communication systems when and if it is needed.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, multiple signals of 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals (or optical signals) and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. This may be especially important in a flexible grid network. ROADMs are considered 'directionless' when the ROADM is able to add/drop any wavelength to a specific add/drop port regardless of the direction of propagation. ROADMs are considered contentionless' when the ROADM is able to switch any wavelength on a port even if other ports are using the same wavelength at a different port which could be a contended wavelength (already occupied wavelength). As shown OADM 110 may represent an implementation of a route and collect ROADM, as disclosed herein.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal.

Demultiplexer 105 may divide the single, forty channel DWDM signal into forty separate signals according to the forty different channels. In some embodiments, the functionality of multiplexer 104 and demultiplexer 105 may be implemented in an add/drop complex, such as those described herein.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

To provide colorless-directionless-contentionless (CDC) functionality, existing optical communication systems typically include a core ROADM device with an attached modular drop device to increase the total number of available drop ports. For example, the vast majority of commercial CDC systems are built with an active, and complicated, add/drop device based on a multi-cast switch (MCS) architecture. The MCS device includes a large number of switches, splitters, and couplers, in multiple layers, and may also include a large number of expensive optical amplifiers to compensate for optical component losses within the MCS device itself. Because MCS devices include multiple amplifiers, multiple switches, multiple couplers and multiple splitters, they are relatively expensive devices, on a per port basis. Today, these devices offer sixteen add/drop pairs per device (each add/drop pair being sometimes referred to as a "drop"), typically in a four- or eight-degree by sixteen drop configuration.

An upcoming generation of CDC technology may use a contentionless WSS, rather than an MCS device, to increase capacity. These contentionless WSS devices may have some technical advantages over MCS device, but are likely to be at approximately cost parity (on a per port basis) with MCS technology. For example, the contentionless WSS devices may be able to extract single wavelengths without splitter/coupler devices, and may support the same contentionless features as an MCS device.

Disclosed herein is an architecture for a ROADM complex that utilizes a CDC ROADM as a passive system in place of an MCS device. This approach may reduce the need for attached modular drop devices in many systems. More specifically, the ROADM complex architecture described herein may take advantage of spare functionality in the latest generation of ROADM core switches to provide the functionality that would otherwise be provided by an attached modular drop device. For example, early generations of ROADM devices supported only eight or nine drop ports. Later generations of ROADM devices supported up to twenty drop ports. However the upcoming generation of ROADM devices may support 1×32 or 2×32 core switches. Therefore, in the vast majority of existing commercial optical network, there may be many spare ports, and corresponding switching functionality, that can be repurposed to provide low cost CDC functionality without the need for an attached modular drop device. In other words, the spare switching functionality may be brought into service as single layer CDC devices, in some embodiments.

Figure 2A:
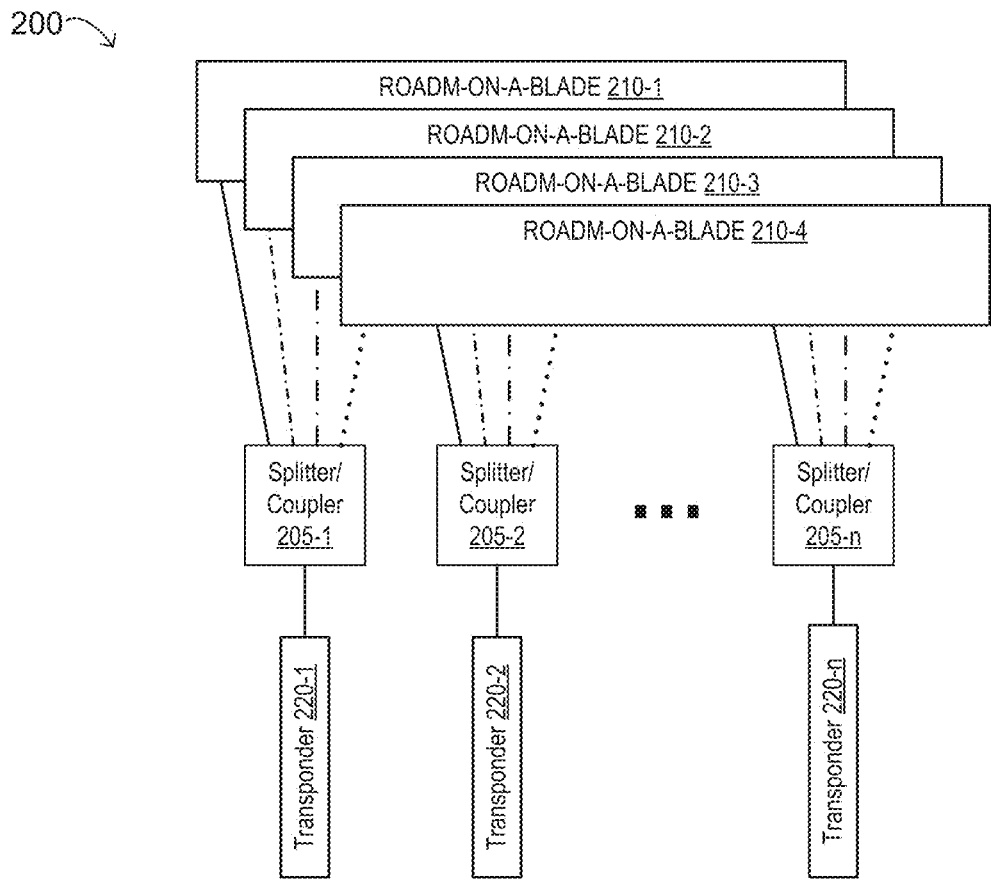
FIG. 2A is a block diagram of selected elements of an embodiment of splitter-based colorless-directionless-contentionless (CDC) reconfigurable optical add/drop multiplexer (ROADM) complex.

FIG. 2A is a block diagram illustrating selected elements of a splitter-based colorless-directionless-contentionless (CDC) reconfigurable optical add/drop multiplexer (ROADM) complex 200, in accordance with some embodiments. In the illustrated embodiment, ROADM complex 200 includes four core ROADM-on-a-blade devices 210 to accommodate four degrees, and a plurality of splitter/coupler devices 205, each of which is coupled to a respective transponder 220. Note that, in various embodiments, each transponder 220 may be or include any wavelength generating device appropriate for the particular optical signals such as, for example, a transponder, a muxponder, a switchponder, or various pluggable optics. Each of the splitter/coupler devices 205 may handle optical signals within a single wavelength, or wavelength band, on behalf of each of the four core ROADM-on-a-blade devices 210. Thus, there is no contention. For example, for each splitter/coupler device, the respective connections to each of the four core ROADM-on-a-blade devices 210 are shown with different line patterns. In some embodiments, the plurality of splitter/coupler devices 205 may be included in a fiber distribution panel within ROADM complex 200, while the transponders 220 may reside outside ROADM complex 200.

Figure 2B:
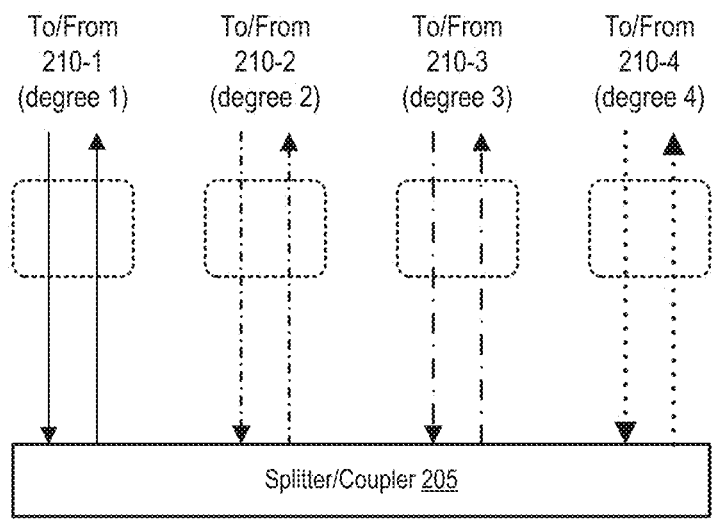
FIG. 2B is a block diagram of selected elements of an embodiment of a splitter/coupler device in a splitter-based CDC ROADM.

FIG. 2B is a block diagram illustrating selected elements of a splitter/coupler device 205 in a splitter-based CDC ROADM complex, such as ROADM complex 200 shown in FIG. 2A, in accordance with some embodiments. As described above, the splitter/coupler device 205 receives optical signals from and passes optical signals to each of four core ROADM devices 210. In this example, the respective line patterns indicate which of the four core ROADM devices 210, and thus which degree, is associated with optical signals exchanged between the splitter/coupler device 205 and the four core ROADM devices 210.

Figure 3:
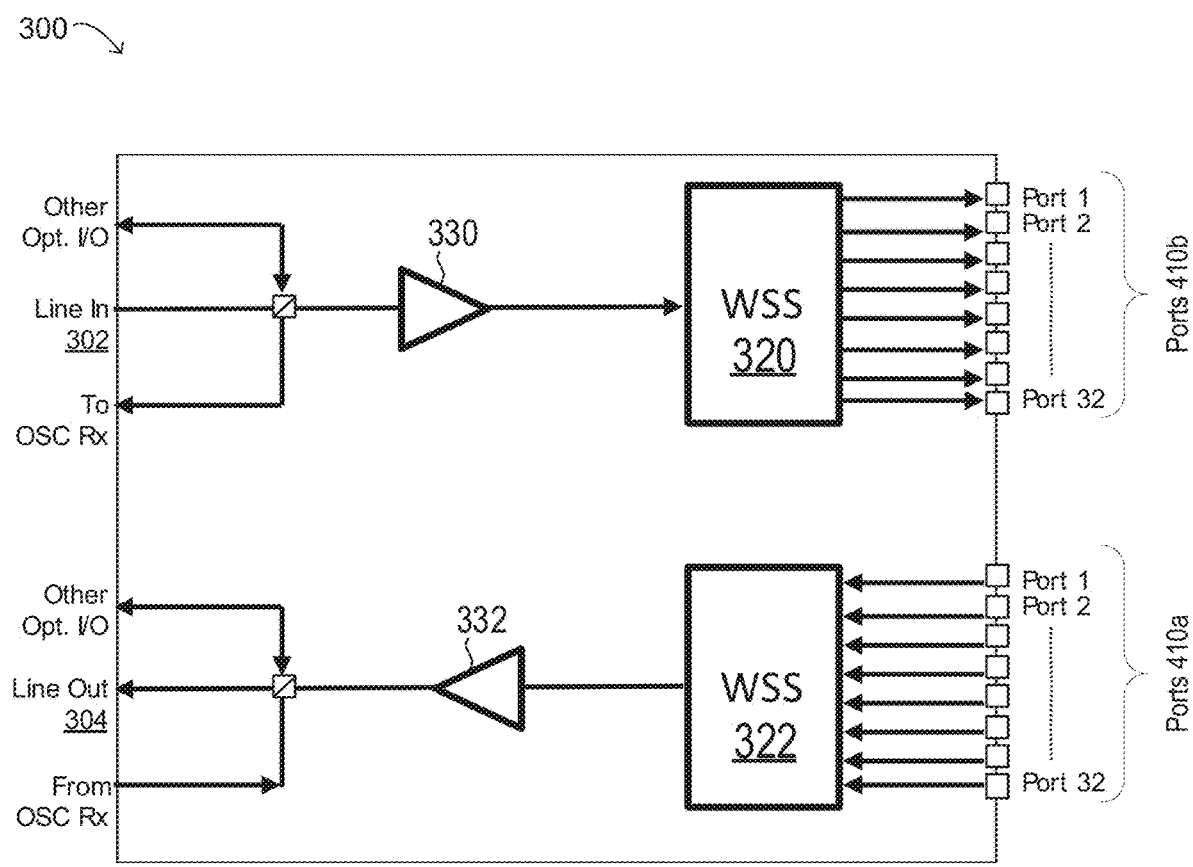
FIG. 3 is a block diagram of selected elements of an embodiment of a 32-port CDC ROADM-on-a-blade.

FIG. 3 is a block diagram illustrating selected elements of a 32-port CDC ROADM-on-a-blade (RoB) 300, in accordance with some embodiments. In the example embodiment, RoB 300 includes twin 2×32 wavelength selective switches, shown as WSS 320 and WSS 322, thirty-two input ports 410a, thirty-two output ports 410b, and amplifiers 330 and 332, among other elements. In the illustrated embodiment, RoB 300 may be configured to route optical signals and having wavelengths in the C-band on a standard (fixed) grid or in a flexible grid (e.g., with 37.5 GHz, 50 GHz, or 75 GHz channel widths). In this example, RoB 300 includes thirty-two input/output port pairs available to build degrees and/or to add CDC add/drop capacity through an available expansion option. Optical signals received at input 302 may be output as thirty-two wavelength-selected signals at respective ones of port 410b1. Optical signals at selected wavelengths received at respective ones of ports 410a may be combined and output at 304.

In various embodiments, the methods and apparatus described herein may provide a flexible approach for routing optical signals using a CDC ROADM complex in an optical network. For example, in embodiments in which there are only a few degrees at a given node in optical network, e.g., one to four degrees, the techniques described herein may be used to provide a low cost, low channel count solution using splitter/coupler devices that are integrated in a fiber distribution panel as shown in FIGS. 2A and 2B. For medium and larger nodes with from one to eight degrees, or more, and a large number of drop ports (e.g., twenty-four or more drops), the capacity of the ROADM complex may enable a suitable expansion option to add capacity to the ROADM complex. In some embodiments, these techniques may provide a low cost of entry for optical communications that are originally built with a small number of degrees and drops while making expansion options available to accommodate future growth both in the number of degrees and the number of drops. For example, unlike with existing CDC solutions, for the vast majority of optical network nodes with only two or three degrees and fewer than sixteen drop ports, the relatively high cost of a multi-cast switch, which may be on the order of ten times the cost of the fiber distribution panels described herein, may be avoided until and unless a significant increase in capacity is needed. At that point, the additional cost of an expansion device, which may be similar to the cost of a multi-cast switch, may be warranted.

In one example embodiment, a ROADM complex may include two core ROADM devices (e.g., RoB devices), each including twin 32-port WSS devices, and a single fiber distribution panel including multiple splitter/coupler devices, as shown in FIGS. 2A and 2B. The fiber distribution panel may serve as a passive interface device to connect, by fiber optic cables, one or both of the RoB devices to various ones of multiple transponders. In this example embodiment, up to four degrees may be accommodated by each of the core ROADM devices, and there may be twenty-eight direct drop ports off of the fiber distribution panel with which to connect to the transponders. In other embodiments, a ROADM complex may include only a single core ROADM device or may include more than two core ROADM devices. As described in more detail in reference to FIGS. 5 and 7, a ROADM complex may also include one or more expansion devices through which capacity may be increased.

Figure 4:
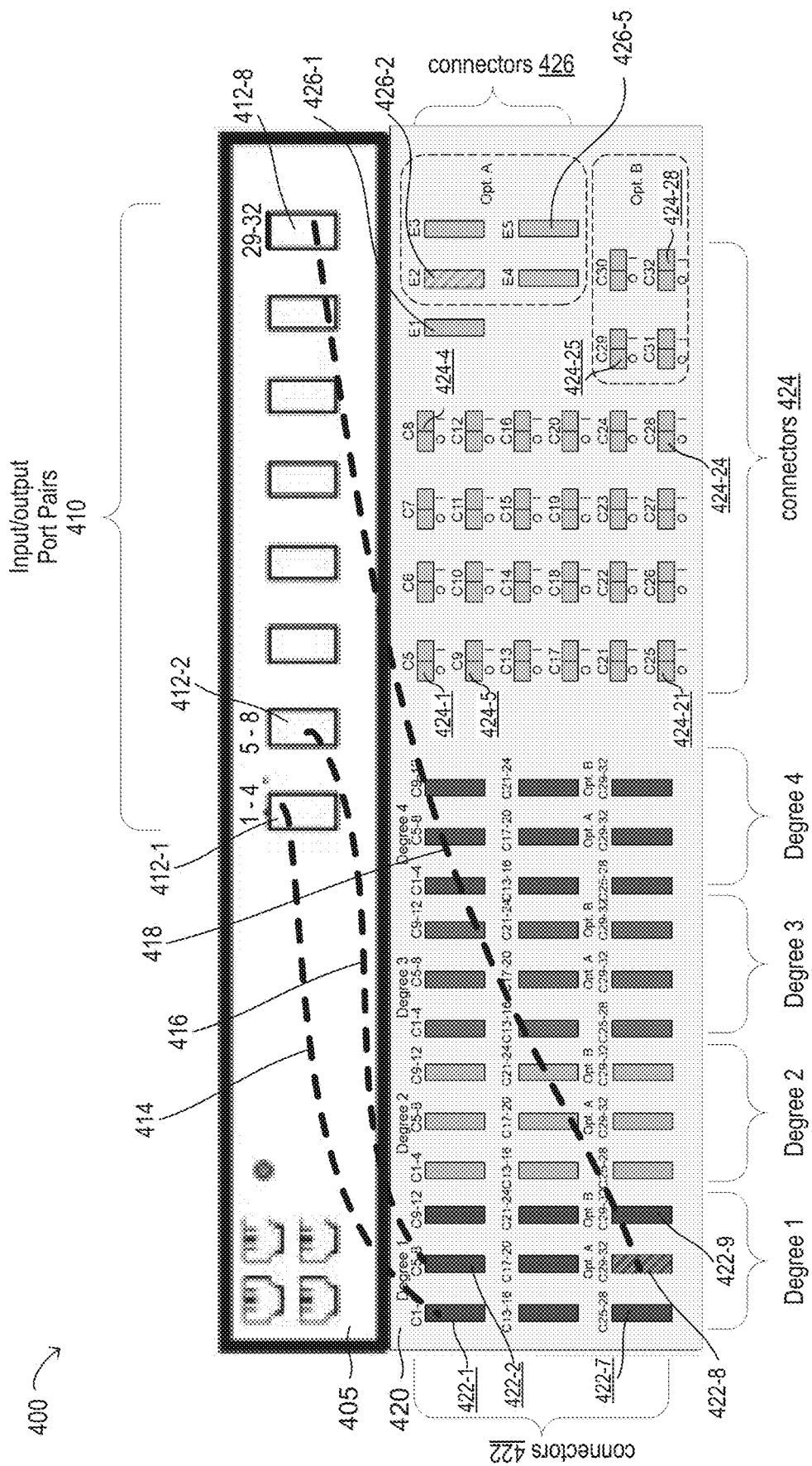
FIG. 4 is a block diagram of selected elements of an embodiment of a ROADM complex including a core ROADM device and a fiber distribution panel.

FIG. 4 illustrates selected elements of an embodiment of a ROADM complex 400 including a single core ROADM device 405 (e.g., an RoB device) and a fiber distribution panel 420. In the illustrated example embodiment, ROADM complex 400 may be configurable to support expansion to four degrees and 144 drops. In other embodiments, ROADM complex 400 may support more or fewer degrees and/or drops. In the illustrated example, core ROADM device 405 includes eight port connectors 412, each of which is configured for coupling to a fiber optic cable that carries optical signals to a respective one of thirty-two fiber distribution panel (FDP) connectors 422. In the illustrated embodiments, each of the FDP connectors 422 may be a compound connector to which eight fibers within a single fiber optic cable are coupled to carry bidirectional traffic between core ROADM device 405 and fiber distribution panel 420 for up to four wavelengths within a wavelength band. For example, at least some of the port connectors 412 may pass traffic to and from four input/output port pairs from among thirty-two input/output port pairs 410 of a wavelength selective switch in the core ROADM device 405.

In some cases, internal splitter/coupler devices within fiber distribution panel 420, which may be similar to splitter/coupler devices 205 illustrated in FIGS. 2A and 2B, may extract optical signals having particular single wavelengths from the optical signals at a given FDP connector 422 and route each extracted optical signal to a respective transponder connector 424, through which the extracted optical signal may be routed to a transponder. For example, fiber optic cable 416 couples port connector 412-2, corresponding to input/output port pairs 5-8, to FDP connector 422-2. Internal splitter/coupler devices within fiber distribution panel 420, which may be similar to splitter/coupler devices 205 illustrated in FIGS. 2A and 2B, may extract up to four optical signals of different wavelengths from the optical signals received over fiber optic cable 416 and may route each extracted optical signal to a respective one of the first four transponder connectors 424, shown as transponder connectors 424-1 through 424-4. Each of the transponder connectors 424-1 through 424-4 may be configured to be coupled to a respective transponder (not shown in FIG. 4) by a fiber optic cable. Additional fiber optic cables (not shown in FIG. 4) may couple each of port connectors 412-3 through 412-7, corresponding to input/output port pairs 9-12, 13-16, 17-20, 21-24, and 25-28, to FDP connectors 422-3 through 422-7, respectively. Internal splitter/coupler devices within fiber distribution panel 420, which may be similar to splitter/ coupler devices 205 illustrated in FIGS. 2A and 2B, may extract up to four optical signals of different wavelengths from the optical signals received over these fiber optic cables and may route each extracted optical signal to a respective one of transponder connectors 424-5 through 424-24. Each of the transponder connectors 424-5 through 424-24 may be configured to be coupled to a respective transponder (not shown in FIG. 4) by a fiber optic cable.

In the illustrated embodiment, port connector 412-8 corresponds to input/output port pairs 29-32. As described in more detail below, the functionality provided by signals at input/output port pairs 29-32 may be different than that provided by input/output port pairs 5-28. In some embodiments, the first four input/output port pairs 410 of core ROADM device 405 may also serve a different function than the remaining input/output port pairs 410. For example, in the illustrated embodiment, each of input/output port pairs 1 through 3 may be used to couple core ROADM 405 to another device, such as fiber distribution panel 420 or another core ROADM device, and input/output port pair 4 may be used to carry optical signals between core ROADM device 405 and an expansion device through direct fiber connections within fiber distribution panel 420. In the illustrated embodiment, fiber optic cable 414 couples port connector 412-1, corresponding to input/output port pairs 1-4, to FDP connector 422-1.

In the illustrated embodiment, fiber distribution panel 420 includes four collections of FDP connectors 422, each corresponding to one of four degrees supportable in ROADM complex 400. Fiber optic cables from each ROADM device up to four ROADM devices may be used to connect input/output ports of the ROADM device to the FDP connectors for a respective one of the four degrees. In the example illustrated in FIG. 4, core ROADM device 405 is associated with a first degree in ROADM complex 400. This is shown by the connection, over fiber optic cable 414, between port connector 412-1 and FDP connector 422-1, which is an FDP connector associated with degree 1. In embodiments in which four degrees are accommodated, port connectors of a second core ROADM device similar to core ROADM device 405 may be connected over fiber optic cables to FDP connectors associated with degree 2, port connectors of a third core ROADM device similar to core ROADM device 405 may be connected over fiber optic cables to FDP connectors associated with degree 3, and port connectors of a fourth core ROADM device similar to core ROADM device 405 may be connected over fiber optic cables to FDP connectors associated with degree 4.

In the example embodiment illustrated in FIG. 4, the fiber distribution panel 420 includes five expansion connectors 426. Each of the expansion connectors 426 may be configured to be coupled to a respective expansion device (not shown in FIG. 4) by a fiber optic cable. At various times, and under certain circumstances, one or more of the expansion connectors 426 may be enabled to route optical signals from a core ROADM device through direct fiber connections within fiber distribution panel 420 to a respective expansion device to increase the number of available drops. In the illustrated example, ROADM complex 400 supports two expansion options. With both options, input/output port pair 4 of core ROADM device 405 is enabled to carry optical signals between core ROADM device 405 and FDP connector 422-1, which routes the signals over a direct fiber connection to expansion connector 426-1 for coupling fiber distribution panel 420 to an expansion device. According to a first option (option A), the remaining four expansion connectors, shown as expansion connectors 426-2 through 426-5, are also enabled to receive optical signals originating from a core ROADM device and routed through fiber distribution panel 420 using direct fiber connections to be coupled to a respective expansion device.

FIG. 4 illustrates the connections used to configure ROADM complex 400 in accordance with a first expansion option A. In accordance with option A, twenty-four individual drops to transponders are available using transponder connectors 424-1 through 424-24. In addition, all five expansion connectors 426 are enabled for adding respective expansion devices, i.e., up to five additional add/drop devices, each of which may add up to twenty-four drop ports. More specifically, fiber optic cable 418 couples port connector 412-8, corresponding to input/output port pairs 29-32, to FDP connector 422-8, which may be indicative of the first expansion option (option A). In the illustrated example, direct fiber connections within the fiber distribution panel 420 may route the optical signal at FDP connector 422-8 to a second one of the five expansion connectors 426, shown as expansion connector 426-2 for subsequent coupling to an expansion device (not shown in FIG. 4).

Figure 5:
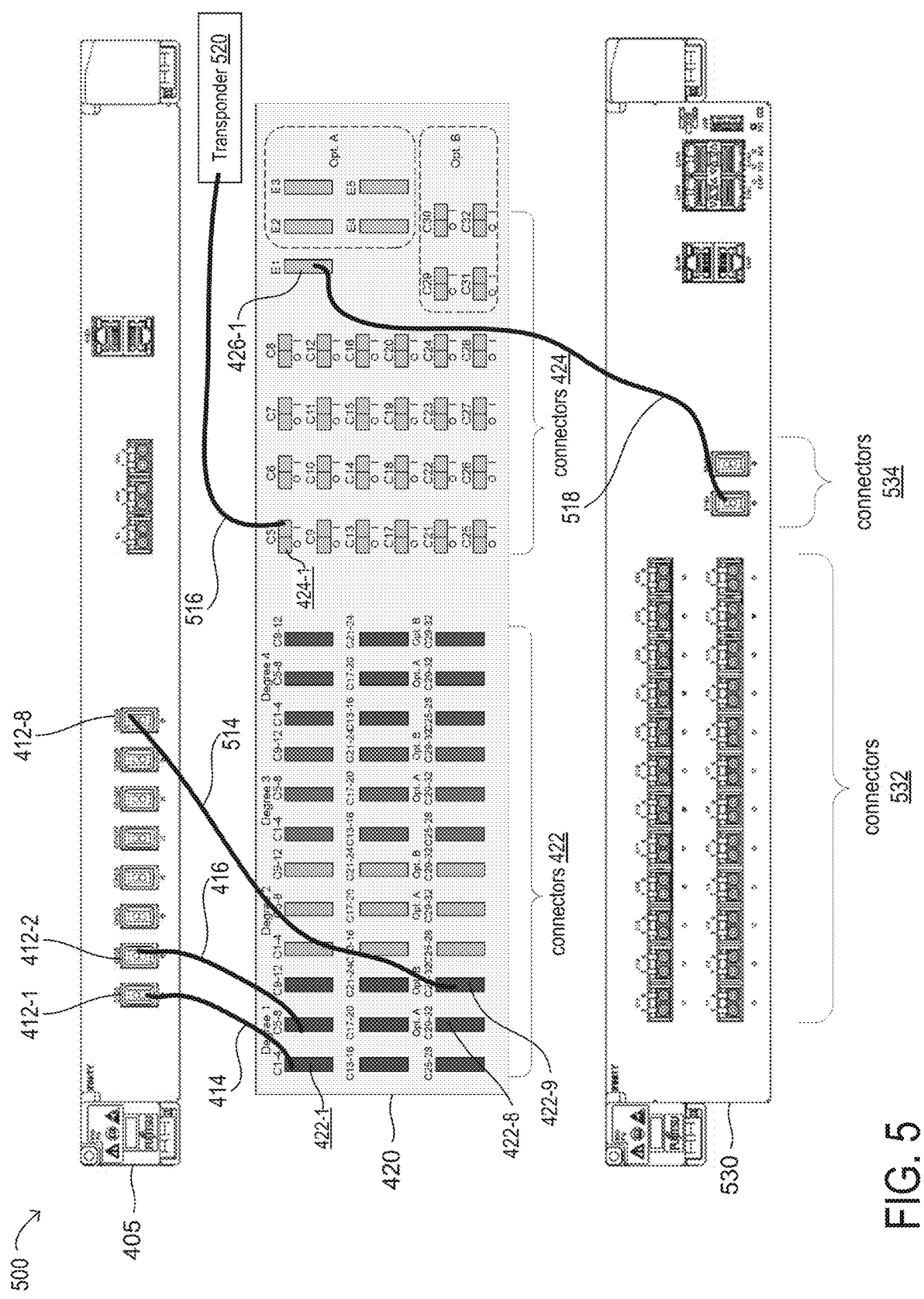
FIG. 5 is a block diagram of selected elements of an embodiment of a ROADM complex including a core ROADM device, a fiber distribution panel, and an expansion device.

As illustrated in FIG. 5 and described in more detail below, if fiber optic cable 418 had coupled port connector 412-8, corresponding to input/output port pairs 29-32, to FDP connector 422-9 rather than to FDP connector 422-8, this may have been indicative of a second expansion option (option B). In this case, only expansion connector 426-1 would be enabled for adding an expansion device to the ROADM complex and four additional individual drops to transponders would be available through transponder connectors 424-25 through 424-28.

In at least some embodiments, each of the transponder connectors 424 may be an LC connector, which is a small form factor optical connector including a retaining tab mechanism. Typically, two LC connectors are held together in a duplex configuration by a plastic clip.

FIG. 5 illustrates selected elements of a ROADM complex 500 including a core ROADM device 405 (e.g., an RoB device), a fiber distribution panel 420, and an expansion device 530, in accordance with some embodiments. In the illustrated embodiment, core ROADM device 405 is similar to core ROADM device 405 illustrated in FIG. 4 and fiber distribution panel 420 is similar to fiber distribution panel 420 illustrated in FIG. 4. In this example, the expansion device 530 is an 8×24 CDC device comprising twenty-four transponder connectors 532, each of which is configured to be coupled to a respective transponder (not shown in FIG. 5) and two expansion connectors, through which expansion device can be coupled to fiber distribution panel 420. In other embodiments, expansion device 530 may be a different type of expansion device, such as a multi-cast switch, for example.

As in the example embodiment illustrated in FIG. 4, fiber optic cable 414 couples port connector 412-1, corresponding to input/output port pairs 1-4, to FDP connector 422-1. As in the previous example, each of input/output port pairs 1 through 3 may be used to couple core ROADM 405 to another device, such as fiber distribution panel 420 or another core ROADM device, and input/output port pair 4 may be used to carry optical signals between core ROADM device 405 and expansion device 530 through direct fiber connections within fiber distribution panel 420.

In the example embodiment illustrated in FIG. 5, ROADM complex 500 supports the same two expansion options described above in reference to FIG. 4. FIG. 5 illustrates the connections used to configure ROADM complex 500 in accordance with the second expansion option (option B) in which there are twenty-eight individual drops to transponders available and only a single expansion connector 426 enabled. More specifically, fiber optic cable 514 couples port connector 412-8, corresponding to input/output port pairs 29-32, to FDP connector 422-9, which may be indicative of the second expansion option (option B). In the illustrated embodiment, fiber optic cable 416 couples port connector 412-2, corresponding to input/output port pairs 5-8, to FDP connector 422-2. Internal splitter/coupler devices within fiber distribution panel 420, which may be similar to splitter/coupler devices 205 illustrated in FIGS. 2A and 2B, may extract up to four optical signals of different wavelengths from the optical signals received over fiber optic cable 416 and may route each extracted optical signal to a respective one of the transponder connectors 424-1 to 424-4. Similarly, additional fiber optic cables (not shown in FIG. 5) may couple each of port connectors 412-3 through 412-8, corresponding to input/output port pairs 9-12, 13-16, 17-20, 21-24, 25-28, and 29-32 to FDP connectors 422-3 through 422-7 and 422-9, respectively. Internal splitter/coupler devices within fiber distribution panel 420, which may be similar to splitter/coupler devices 205 illustrated in FIGS. 2A and 2B, may extract up to four optical signals of different wavelengths from the optical signals received over these fiber optic cables and may route each extracted optical signal to a respective one of transponder connectors 424-5 through 424-28. Each of the transponder connectors 424-1 through 424-28 may be configured to be coupled to a respective transponder by a fiber optic cable. For example, fiber optic cable 516 couples transponder connector 424-1 to transponder 520. Other connections between port connectors 412 and FDP connectors 422 and between transponder connectors 424 and respective transponders are not shown in FIG. 5 for clarity.

In accordance with option B, only one of the expansion connectors (shown as 426-1) is enabled for coupling fiber distribution panel 420 to an expansion device, i.e., an additional add/drop device. In this example, in which expansion device 530 is an 8×24 CDC, this would add an additional twenty-four drops to ROADM complex 500 that could be used to connect to respective transponders once the first twenty-eight individual drops available directly from ROADM complex 500 through the transponder connectors 424 of fiber distribution panel 420 are exhausted. In the illustrated embodiment, fiber optic cable 518 couples expansion connector 426-1 to the first of two expansion connectors 534 of expansion device 530, thus allowing up to twenty-four additional drops to be added to ROADM complex 500 through respective ones of connectors 532.

Figure 6:
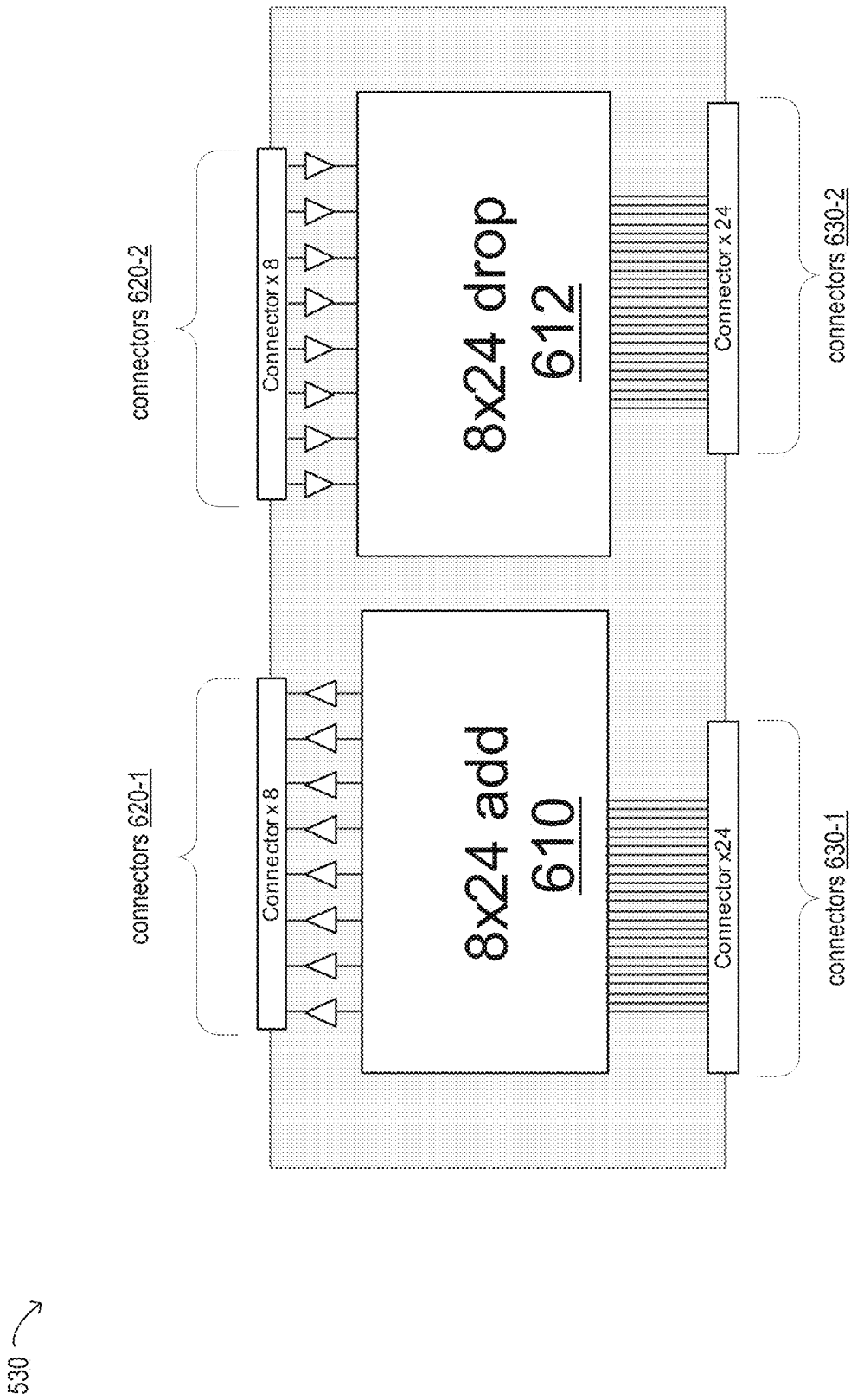
FIG. 6 is a block diagram of selected elements of an embodiment of an expansion device for a ROADM complex.

FIG. 6 is a block diagram illustrating selected elements of an expansion device 530 for a ROADM complex, such as ROADM complex 500 illustrated in FIG. 5, in accordance with some embodiments. In the illustrated embodiment, expansion device 530 is an 8×24 CDC add/drop device including twenty-four input/outpoint connector pairs (shown in FIG. 6 as connectors 630-1 and 630-1) for coupling the expansion device 530 to respective client ports (e.g., transponders) in up to eight C-band CDC ROADM degrees. Expansion device 530 includes eight input/outpoint connector pairs (shown in FIG. 6 as connectors 620-1 and 620-1) for coupling the expansion device 530 to respective core ROADM devices, each associated with one of up to eight degrees. In this example, expansion device 530 is built using twin 8×24 contentionless WSS devices, shown as WSS 610 and WSS 612, within the same blade. In this example, expansion device 530 also includes channel amplifiers. In other embodiments, expansion device 530 may include more, fewer, or different elements than those illustrated in FIG. 6 to provide additional capacity in a ROADM complex.

Figure 7:
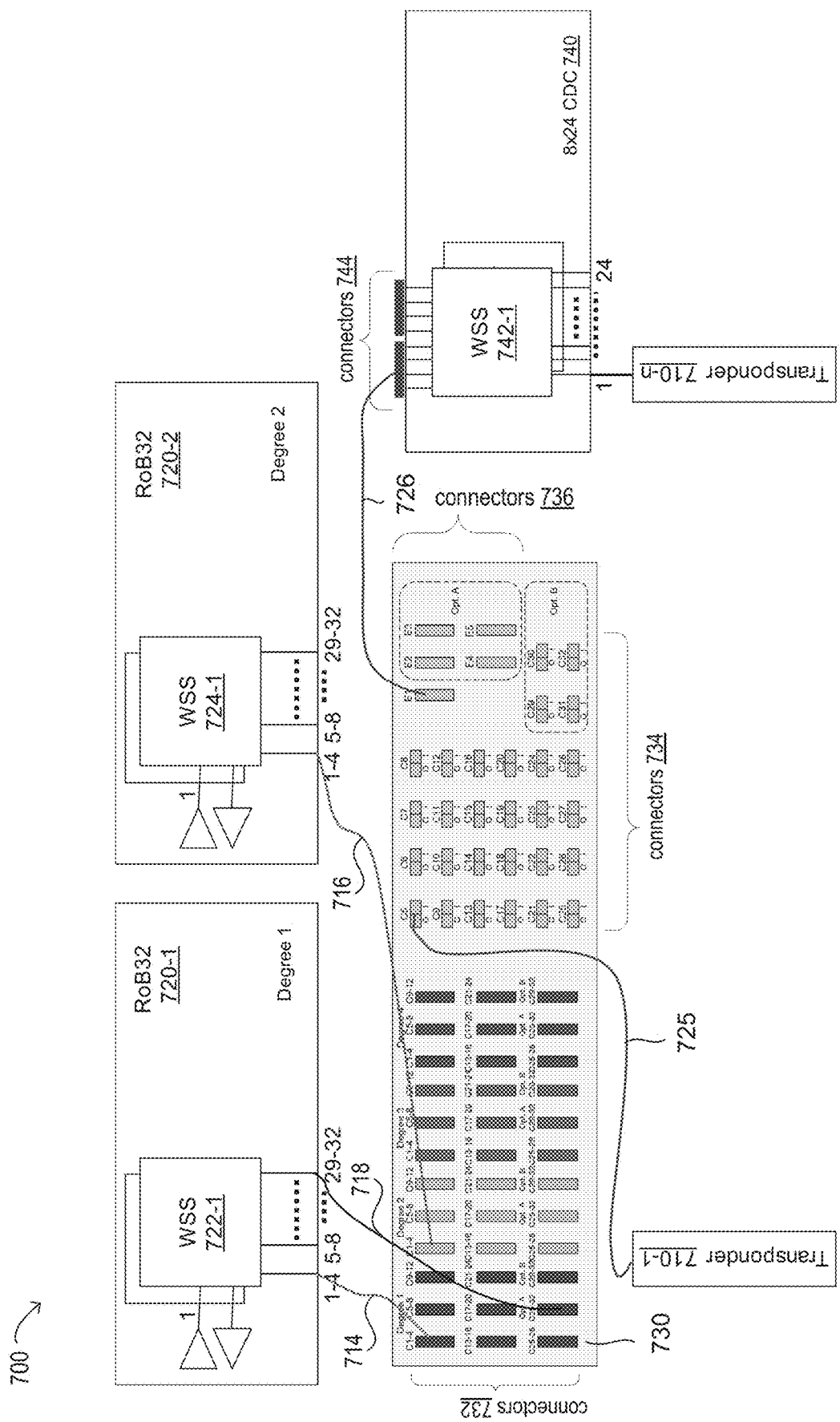
FIG. 7 is a block diagram of selected elements of an embodiment of a ROADM complex including two core ROADM devices, a fiber distribution panel, and an expansion device.

FIG. 7 illustrates selected elements of a ROADM complex 700 including two core ROADM devices 720, a fiber distribution panel 730, and an expansion device 740, in accordance with some embodiments. In the illustrated embodiment, each of the core ROADM devices 720 may be similar to core ROADM device 405 illustrated in FIG. 4 and fiber distribution panel 730 may be similar to fiber distribution panel 420 illustrated in FIG. 4. Each core ROADM device 720 may be similar to RoB 300 illustrated in FIG. 3. For example, core ROADM device (RoB) 720-1 includes twin 1×32 wavelength selective switches 722, thirty-two input/output port pairs, and a pair of amplifiers, among other elements, and core ROADM device (RoB) 720-2 includes twin 1×32 wavelength selective switches 724, thirty-two input/output port pairs, and a pair of amplifiers, among other elements. RoB 720-1 is associated with degree 1 in ROADM complex 700 and RoB 720-2 is associated with degree 2. In this example, the expansion device 740 is an 8×24 CDC device comprising twenty-four transponder ports, each of which is configured to be coupled to a respective transponder, and two expansion connectors 744, through which expansion device 740 can be coupled to a fiber distribution panel, such as fiber distribution panel 730. In some embodiments, expansion device 740, which may be similar to expansion device 530 illustrated in FIGS. 5 and 6, includes twin 8×24 wavelength selective switches 742 and twenty-four input/output port pairs, among other elements In other embodiments, expansion device 740 may be a different type of expansion device, such as a multi-cast switch, for example.

In the illustrated example, fiber optic cable 714 couples a port connector corresponding to input/output port pairs 1-4 of RoB 720-1, to a first one of nine FDP connectors 732 associated with degree 1. As in the previous examples, each of input/output port pairs 1 through 3 may be used to couple RoB 720-1 to another device, such as fiber distribution panel 730 or another RoB device, and input/output port pair 4 may be used to carry optical signals between RoB 720-1 and an expansion device through direct fiber connections within fiber distribution panel 730. Other input/output port pairs of RoB 720-1 may be coupled to respective FDP connectors 732 associated with degree 1 over fiber optic cables. Internal splitter/coupler devices within fiber distribution panel 730, which may be similar to splitter/coupler devices 205 illustrated in FIGS. 2A and 2B, may extract up to four optical signals of different wavelengths from the optical signals received over each of these fiber optic cables and may route each extracted optical signal to a respective one of the transponder connectors 734. Each of the transponder connectors 734 may be configured to be coupled to a respective transponder by a fiber optic cable. For example, fiber optic cable 725 couples the first transponder connector 734 to transponder 710-1. Other connections between port connectors of RoB 720-1 and FDP connectors 732 associated with degree 1 and connections between transponder connectors 734 and respective transponders associated with degree 1 are not shown in FIG. 7 for clarity.

Similarly, fiber optic cable 716 couples a port connector corresponding to input/output port pairs 1-4 of RoB 720-2, to a first one of nine FDP connectors 732 associated with degree 2. As in the previous examples, each of input/output port pairs 1 through 3 may be used to couple RoB 720-2 to another device, such as fiber distribution panel 730 or another RoB device, and input/output port pair 4 may be used to carry optical signals between RoB 720-2 and an expansion device through direct fiber connections within fiber distribution panel 730. Other input/output port pairs of RoB 720-2 may be coupled to respective FDP connectors 732 associated with degree 2 over fiber optic cables. Internal splitter/coupler devices within fiber distribution panel 730, which may be similar to splitter/coupler devices 205 illustrated in FIGS. 2A and 2B, may extract up to four optical signals of different wavelengths from the optical signals received over each of these fiber optic cables and may route each extracted optical signal to a respective one of the transponder connectors 734. Other connections between port connectors of RoB 720-2 and FDP connectors 732 associated with degree 2 and connections between transponder connectors 734 and respective transponders associated with degree 2 are not shown in FIG. 7 for clarity.

In the example embodiments illustrated in FIG. 7, ROADM complex 700 supports the same two expansion options described above in reference to FIGS. 4 and 5. In the illustrated embodiment, ROADM complex 700 is configured in accordance with the first expansion option (option A), in which there are twenty-four individual drops to transponders available using twenty-four of the transponder connectors 734 and in which all five expansion connectors 736 are enabled for coupling fiber distribution panel 730 to respective expansion devices, i.e., up to five additional add/drop devices, each of which may add up to twenty-four drop ports.

FIG. 7 illustrates the connections used to configure ROADM complex 700 in accordance with the first expansion option A. In the illustrated example, expansion connector 736 is shown connected to expansion device 740 over fiber optic cable 726. In this example, expansion device 740 is an 8×24 CDC, which would add an additional twenty-four drops to ROADM complex 700 that could be used to connect to respective transponders once the first twenty-four individual drops available directly from ROADM complex 700 through the transponder connectors 734 of fiber distribution panel 730 are exhausted.

In this example, fiber optic cable 718 couples a port connector corresponding to input/output port pairs 29-32 of RoB 720-1 to the eighth FDP connector 732 associated with degree 1, which may be indicative of the first expansion option (option A). In the illustrated example, direct fiber connections within the fiber distribution panel 730 may route the optical signal received at the eighth FDP connector 732 associated with degree 1 to the remaining four expansion connectors 736. In the illustrated embodiment, fiber optic cable 726 couples the first expansion connector 736 to the first of two expansion connectors 744 of expansion device 740, thus allowing up to twenty-four additional drops to be added to ROADM complex 700. In the illustrated example, a transponder 710-*n* is coupled to the first of the twenty-four transponder ports of the expansion device 740. Additional connections between fiber distribution panel 730 and other expansion devices and connections between expansion device 740 and other transponders 710 are not shown in FIG. 7 for clarity.

In some embodiments, depending on how the optical budget is allocated, it may be possible, or even desirable, to add an amplification function in the fiber distribution panel. In such embodiments, the fiber distribution panel might not be entirely passive, but may include relatively simple single channel amplifiers at the outward facing interfaces of the fiber distribution panel to increase optical power if there is insufficient optical power in the optical channels. In other embodiments, amplifiers may be added external to the fiber distribution panel to improve performance in certain cases.

Figure 8:
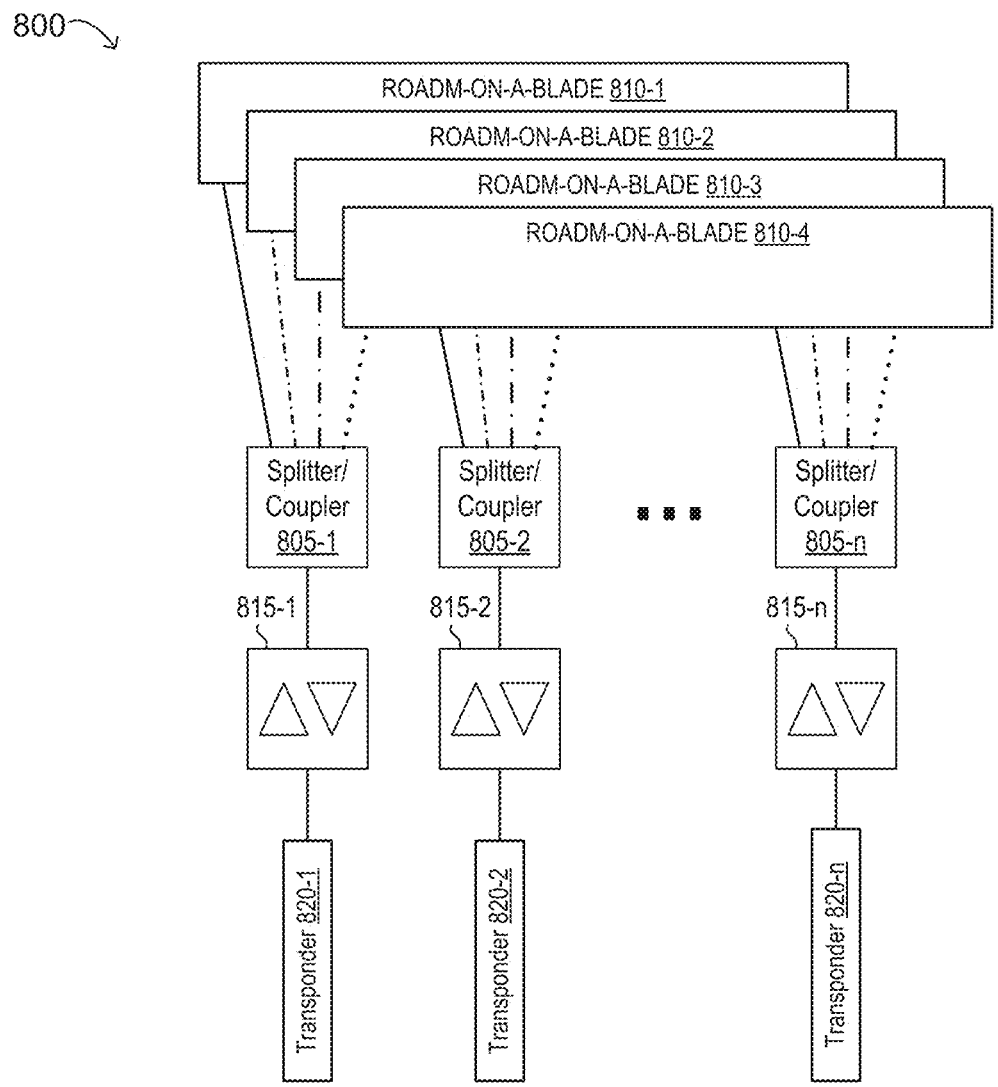
FIG. 8 is a block diagram of selected elements of an embodiment of a splitter/coupler device in a splitter-based CDC ROADM complex including single-channel amplifiers.

FIG. 8 is a block diagram illustrating selected elements of an embodiment of a splitter/coupler device 800 in a splitter-based CDC ROADM complex including single-channel amplifiers, in accordance with some embodiments. In the illustrated embodiment, ROADM complex 800 includes four core ROADM-on-a-blade devices 810 to accommodate four degrees, and a plurality of splitter/coupler devices 805, each of which is coupled to a respective transponder 820 through a respective single channel amplifier 815. Each of the splitter/coupler devices 805 may handle optical signals within a single wavelength, or wavelength band or even selected separated wavelengths, on behalf of each of the four core ROADM-on-a-blade devices 810. For example, for each splitter/coupler device, the respective connections to each of the four core ROADM-on-a-blade devices 810 are shown with different line patterns. In some embodiments, the plurality of splitter/coupler devices 805 and the plurality of single channel amplifiers 815 may be included in a fiber distribution panel within ROADM complex 800, while the transponders 820 may reside outside ROADM complex 800. The example embodiment illustrated in FIG. 8 includes, for each of the splitter/coupler devices, a respective pair of single channel amplifiers of opposite directions configured to amplify the optical signal between the splitter/coupler device and the respective one of the first plurality of transponder connectors. In other embodiments, there may a single amplifier for each splitter/coupler device configured to amplify the optical signal between the splitter/coupler device and the respective one of the first plurality of transponder connectors in only one direction.

Figure 9:
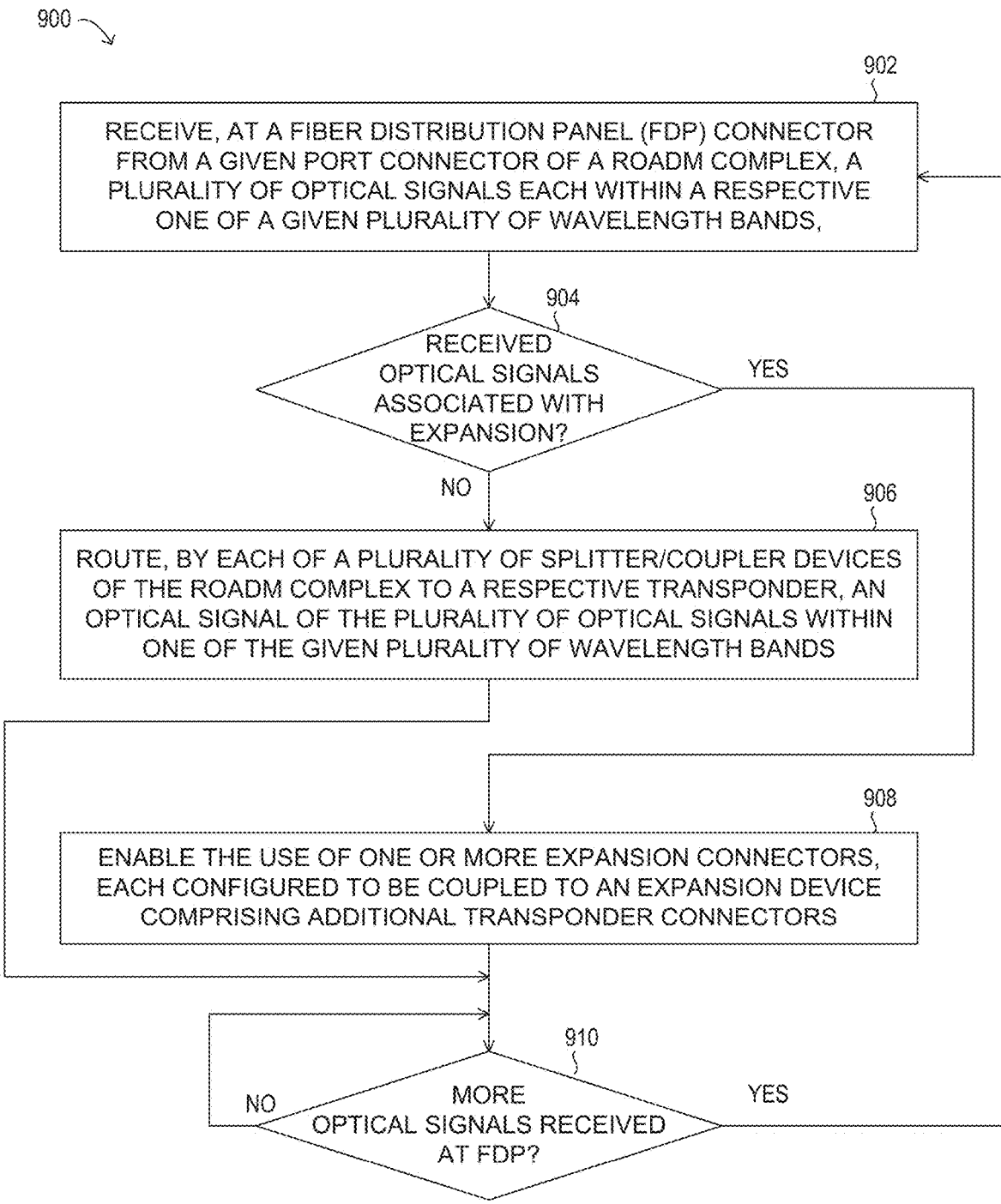
FIG. 9 is a block diagram of selected elements of an embodiment of a method for routing optical signals using a ROADM complex, depicted in flowchart form.

FIG. 9 is a block diagram illustrating selected elements of a method 900 for routing optical signals using a ROADM complex, in accordance with some embodiments. Method 900 may be performed using optical network 101. It will be understood that operations in method 900 may be repeated or duplicated, either in parallel or serially, for routing optical signals using a ROADM complex including any number of core ROADM devices, a fiber distribution panel, and (optionally) one or more expansion devices. It is noted that certain operations described in method 900 may be optional or may be rearranged in different embodiments.

In the illustrated example, method 900 includes, at 902, receiving, at a fiber distribution panel (FDP) connector from a given port connector of a ROADM complex, a plurality of optical signals each within a respective one of a given plurality of wavelength bands. In various embodiments, the given port connector from which the optical signals are received may be a port connector of one of multiple core ROADM devices in the ROADM complex. In other embodiments, the ROADM complex may include only a single core ROADM device.

If, at 904, it is determined that the received optical signals are associated with a ROADM expansion, method 900 may proceed to 908. Otherwise, the method may continue at 906. For example, the optical signals may be received at an FDP connector associated with a transponder or at an FDP connector associated with an expansion option. In some embodiments, the optical signals may be received from a highest order port connector of a core ROADM device at an FDP connector associated with one of multiple expansion options. For example, if the optical signals are received from a highest order port connector of a core ROADM device at an FDP connector associated with an expansion option such as option A described above in reference to FIGS. 4, 5, and 7, this may be indicative of an expansion option in which are configured twenty-four individual drops to transponders and five expansion connectors. On the other hand, if the optical signals are received from the highest order port connector of the core ROADM device at an FDP connector associated with an expansion option such as option B described above in reference to FIGS. 4, 5, and 7, this may be indicative of an expansion option in which are configured twenty-eight individual drops to transponders and one expansion connector. Other expansion options associated with different combinations of transponder connections and expansion connections may be possible, in different embodiments. In some embodiments, the optical signals may be received from port connector of a core ROADM device other than the highest order port connector of the core ROADM device at an FDP connector associated with one of multiple transponder connectors.

At 906, method 900 includes routing, by each of a plurality of splitter/coupler devices of the ROADM complex to a respective transponder, an optical signal of the plurality of optical signals within one of the given plurality of wavelength bands.

At 908, the method includes enabling one or more expansion connectors, each configured to be coupled to an expansion device comprising additional transponder connectors. As described herein, the number of expansion connectors enabled may be dependent on which of multiple expansion options is selected.

If and when, at 910, more optical signals are received at particular FDP connectors, method 900 may return to 902, after which the operations shown as 902 through 908 may be repeated, as appropriate, in response to receiving the additional optical signals.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A reconfigurable optical add/drop multiplexer (ROADM) complex, comprising:
    a first contentionless wavelength selective switch (WSS) device comprising a plurality of input ports;
    a second contentionless WSS device comprising a plurality of output ports, each output port being associated with a respective one of the plurality of input ports in one of a first plurality of input/output port pairs, and each input/output port pair being mapped to a respective wavelength band;
    a first port connector configured for coupling to a first fiber optic cable carrying multiple optical signals on respective fibers each within a first collection of wavelength bands to and from the respective input/output port pairs to which the first collection of wavelength bands are mapped; and
    a fiber distribution panel (FDP) comprising:
        a first FDP connector configured to receive the first fiber optic cable coupled to the first port connector;
        a first plurality of transponder connectors, each configured to be coupled to a respective transponder; and
        a first plurality of splitter/coupler devices, each configured to route an optical signal within a respective one of the first collection of wavelength bands between the first FDP connector and a respective one of the first plurality of transponder connectors.

2. The ROADM complex of claim 1, wherein:
    the first WSS device and the second WSS device are elements of a first core ROADM device associated with a first degree of a plurality of degrees supported in the ROADM complex;
    the first port connector is an element of the first core ROADM device;
    the first FDP connector is associated with the first degree;
    the ROADM complex further comprises a second port connector configured for coupling to a second fiber optic cable carrying multiple optical signals on respective fibers each within a second collection of wavelength bands to and from the respective input/output port pairs to which the second collection of wavelength bands are mapped; and
    the fiber distribution panel further comprises:
        a second FDP connector associated with the first degree; and
        a second plurality of splitter/coupler devices, each configured to route an optical signal within a respective one of the second collection of wavelength bands between the second FDP connector and a respective one of the first plurality of transponder connectors.

3. The ROADM complex of claim 1, wherein
    the first WSS device and the second WSS device are elements of a first core ROADM device associated with a first degree of a plurality of degrees supported in the ROADM complex;
    the first port connector and the first FDP connector are associated with the first degree; and
    the ROADM complex further comprises:
        a third contentionless WSS device comprising a plurality of input ports and a fourth contentionless WSS device comprising a plurality of output ports, the third WSS device and the fourth WSS device being elements of a second core ROADM device associated with a second degree of the plurality of degrees; and a second port connector of the second core ROADM device and configured for coupling to a second fiber optic cable carrying multiple optical signals on respective fibers each within a second collection of wavelength bands to and from the respective input/output port pairs to which the second collection of wavelength bands are mapped; and the fiber distribution panel further comprises:
a second FDP connector associated with the second degree and configured to receive the second fiber optic cable coupled to the second port connector; and
a second plurality of splitter/coupler devices, each configured to route an optical signal within a respective one of the second collection of wavelength bands between the second FDP connector and a respective one of the first plurality of transponder connectors.

4. The ROADM complex of claim 1, wherein:
the ROADM complex further comprises:
a second port connector configured for coupling to a second fiber optic cable carrying multiple optical signals on respective fibers each within a second collection of wavelength bands to and from the respective input/output port pairs to which the second collection of wavelength bands are mapped; and
a first expansion device; and
the fiber distribution panel further comprises:
a second FDP connector associated with an expansion option and configured to receive the second fiber optic cable coupled to the second port connector; and
a first expansion connector that, when enabled, is configured for coupling to the first expansion device to add routing capacity to the ROADM complex, the first expansion connector being enabled for coupling to the first expansion device responsive to receipt of the second fiber optic cable at the second FDP connector.

5. The ROADM complex of claim 4, wherein:
the first expansion connector is one of a plurality of expansion connectors of the fiber distribution panel, each of which, when enabled, is configured for coupling to a respective expansion device to add routing capacity to the ROADM complex;
the expansion option is one of plurality of expansion options supported in the fiber distribution panel; and
one or more of the plurality of expansion connectors, including the first expansion connector, are enabled responsive to receipt of the second fiber optic cable at the second FDP connector, the number of expansion connectors enabled being dependent on which of the plurality of expansion options is associated with the second FDP connector.

6. The ROADM complex of claim 5, wherein:
the expansion option associated with the second FDP connector is an expansion option in which only the first expansion connector is enabled; and
the first plurality of transponder connectors includes all of the transponder connectors of the fiber distribution panel.

7. The ROADM complex of claim 5, wherein:
the expansion option associated with the second FDP connector is an expansion option in which two or more of the plurality of expansion connectors, including the first expansion connector, are enabled; and
the first plurality of transponder connectors includes fewer than all of the transponder connectors of the fiber distribution panel.

8. The ROADM complex of claim 1, further comprising, for each of the first plurality of splitter/coupler devices, a single channel amplifier configured to amplify the optical signal between the splitter/coupler device and the respective one of the first plurality of transponder connectors.

9. An optical network, comprising:
a plurality of transponders; and
a reconfigurable optical add/drop multiplexer (ROADM) complex, comprising:
a first contentionless wavelength selective switch (WSS) device comprising a plurality of input ports;
a second contentionless WSS device comprising a plurality of output ports, each output port being associated with a respective one of the plurality of input ports in one of a first plurality of input/output port pairs, each input/output port pair being mapped to a respective wavelength band;
a first port connector configured for coupling to a first fiber optic cable carrying multiple optical signals on respective fibers each within a first collection of wavelength bands to and from the respective input/output port pairs to which the first collection of wavelength bands are mapped; and
a fiber distribution panel (FDP) comprising:
a first FDP connector configured to receive the first fiber optic cable coupled to the first port connector;
a first plurality of transponder connectors, each configured to be coupled to a respective transponder; and
a first plurality of splitter/coupler devices, each configured to route an optical signal within a respective one of the first collection of wavelength bands between the first FDP connector and a respective one of the first plurality of transponder connectors.

10. The optical network of claim 9, wherein:
the first WSS device and the second WSS device are elements of a first core ROADM device associated with a first degree of a plurality of degrees supported in the ROADM complex;
the first port connector is an element of the first core ROADM device;
the first FDP connector is associated with the first degree;
the ROADM complex further comprises a second port connector configured for coupling to a second fiber optic cable carrying multiple optical signals on respective fibers each within a second collection of wavelength bands to and from the respective input/output port pairs to which the second collection of wavelength bands are mapped; and
the fiber distribution panel further comprises:
a second FDP connector associated with the first degree; and
a second plurality of splitter/coupler devices, each configured to route an optical signal within a respective one of the second collection of wavelength bands between the second FDP connector and a respective one of the first plurality of transponder connectors.

11. The optical network of claim 9, wherein
the first WSS device and the second WSS device are elements of a first core ROADM device associated with a first degree of a plurality of degrees supported in the ROADM complex;
the first port connector and the first FDP connector are associated with the first degree; and
the ROADM complex further comprises:
 a third contentionless WSS device comprising a plurality of input ports and a fourth contentionless WSS device comprising a plurality of output ports, the third WSS device and the fourth WSS device being elements of a second core ROADM device associated with a second degree of the plurality of degrees; and
 a second port connector of the second core ROADM device and configured for coupling to a second fiber optic cable carrying multiple optical signals on respective fibers each within a second collection of wavelength bands to and from the respective input/output port pairs to which the second collection of wavelength bands are mapped; and
the fiber distribution panel further comprises:
 a second FDP connector associated with the second degree and configured to receive the second fiber optic cable coupled to the second port connector; and
 a second plurality of splitter/coupler devices, each configured to route an optical signal within a respective one of the second collection of wavelength bands between the second FDP connector and a respective one of the first plurality of transponder connectors.

12. The optical network of claim 9, wherein:
the ROADM complex further comprises:
 a second port connector configured for coupling to a second fiber optic cable carrying multiple optical signals on respective fibers each within a second collection of wavelength bands to and from the respective input/output port pairs to which the second collection of wavelength bands are mapped; and
 a first expansion device; and
the fiber distribution panel further comprises:
 a second FDP connector associated with an expansion option and configured to receive the second fiber optic cable coupled to the second port connector; and
 a first expansion connector that, when enabled, is configured for coupling to the first expansion device to add routing capacity to the ROADM complex, the first expansion connector being enabled for coupling to the first expansion device responsive to receipt of the second fiber optic cable at the second FDP connector.

13. The optical network of claim 12, wherein:
the first expansion connector is one of a plurality of expansion connectors of the fiber distribution panel, each of which, when enabled, is configured for coupling to a respective expansion device to add routing capacity to the ROADM complex;
the expansion option is one of plurality of expansion options supported in the fiber distribution panel; and
one or more of the plurality of expansion connectors, including the first expansion connector, are enabled responsive to receipt of the second fiber optic cable at the second FDP connector, the number of expansion connectors enabled being dependent on which of the plurality of expansion options is associated with the second FDP connector.

14. The optical network of claim 13, wherein:
the expansion option associated with the second FDP connector is an expansion option in which only the first expansion connector is enabled; and
the first plurality of transponder connectors includes all of the transponder connectors of the fiber distribution panel.

15. The optical network of claim 13,
the expansion option associated with the second FDP connector is an expansion option in which two or more of the plurality of expansion connectors, including the first expansion connector, are enabled; and
the first plurality of transponder connectors includes fewer than all of the transponder connectors of the fiber distribution panel.

16. The optical network of claim 12, wherein the expansion device comprises a multi-cast switch or a contentionless WSS device.

17. The optical network of claim 9, wherein the ROADM complex further comprises, for each of the first plurality of splitter/coupler devices, a respective pair of single channel amplifiers of opposite directions configured to amplify the optical signal between the splitter/coupler device and the respective one of the first plurality of transponder connectors.

18. A method, comprising:
receiving, at a first connector of a fiber distribution panel of a reconfigurable optical add/drop multiplexer (ROADM) complex from a first port connector of the ROADM complex, a first plurality of optical signals each within a respective one of a first plurality of wavelength bands;
routing, by each of a first plurality of splitter/coupler devices of the ROADM complex to a respective one of a first plurality of transponders, an optical signal of the first plurality of optical signals within a respective one of the first plurality of wavelength bands;
receiving, at a second connector of the fiber distribution panel of the ROADM complex from a second port connector of the ROADM complex, a second plurality of optical signals each within a respective one of a second plurality of wavelength bands different from the first plurality of wavelength bands; and
routing, by each of a second plurality of splitter/coupler devices of the ROADM complex to a respective one of a second plurality of transponders, an optical signal of the second plurality of optical signals within a respective one of the second plurality of wavelength bands.

19. The method of claim 18, wherein:
the first port connector and the second connector are associated with a first degree; and
the method further comprises:
 receiving, at a third connector of the fiber distribution panel of the ROADM complex from a third port connector of the ROADM complex associated with a second degree, a third plurality of optical signals each within a respective one of the first plurality of wavelength bands; and
 routing, by each of a third plurality of splitter/coupler devices of the ROADM complex to a respective one of a third plurality of transponders, an optical signal of the third plurality of optical signals within a respective one of the first plurality of wavelength bands.

20. The method of claim 18, comprising:
receiving, at a third connector of the fiber distribution panel of the ROADM complex from a third port connector of the ROADM complex, a third plurality of optical signals; and
in response to receiving the third plurality of optical signals, enabling use of one or more expansion connectors, each configured to be coupled to an expansion device comprising a second plurality of transponder connectors.

* * * * *